Patented June 16, 1942

2,286,330

UNITED STATES PATENT OFFICE 2,286,330

GUANIDINE FERRICYANIDE COMPLEX

Robert B. Barnes, Stamford, Conn., assignor to American Cyanamid Company, New York, N. Y., a corporation of Maine No Drawing. Application May 28, 1940, Serial No. 337,631

6 Claims. (Cl. 260—439)

The present invention relates to complex ferricyanides containing a guanidine radical and alkali metal as new compounds.

It has been discovered that guanidine may be introduced into a compound containing a ferricyanide radical by double decomposition.

For instance, a saturated solution of sodium ferricyanide, when mixed at room temperature with a saturated solution of guanidine carbonate, caused a precipitation of diguanidine sodium ferricyanide in a very few minutes in the form of brown crystals. When this material was dissolved in a small quantity of warm water, on standing in a crystallizing dish, bright red crystals of the compound appeared.

Similarly diguanidine potassium ferricyanide may be formed by mixing saturated solutions of guanidine carbonate and potassium ferricyanide.

In a similar manner, the above compounds may be formed using other soluble guanidine salts such as the hydrochloride and nitrate, although the carbonate is preferred due to its ease of solution in water.

These complex ferricyanides containing guanidine may be used for the preparation of iron blues or light sensitive work such as blueprints, inasmuch as they exhibit light instability. They are also useful as moth larvae repellents.

While the invention has been described with particular reference to specific embodiments, it is to be understood that it is not to be limited thereto but is to be construed broadly and restricted solely by the scope of the appended claims.

I claim:

1. A guanidine alkali metal ferricyanide.
2. Diguanidine sodium ferricyanide.
3. Diguanidine potassium ferricyanide.
4. A method of preparing a guanidine ferricyanide which comprises reacting a saturated solution of an alkali metal ferricyanide with a saturated solution of a guanidine salt.
5. A method of preparing a guanidine ferricyanide which comprising reacting a saturated solution of an alkali metal ferricyanide with a saturated solution of guanidine carbonate.
6. A method of preparing a guanidine ferricyanide which comprises reacting a saturated solution of an alkali metal ferricyanide with a saturated solution of guanidine carbonate at room temperature and collecting the precipitated crystals of diguanidine alkali metal ferricyanide.

ROBERT B. BARNES.